(12) United States Patent
Wong

(10) Patent No.: US 7,660,292 B2
(45) Date of Patent: Feb. 9, 2010

(54) SYSTEM AND METHOD FOR ISOLATING NETWORK CLIENTS

(75) Inventor: David Wong, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 1486 days.

(21) Appl. No.: 10/180,510

(22) Filed: Jun. 27, 2002

(65) Prior Publication Data

US 2004/0001478 A1 Jan. 1, 2004

(51) Int. Cl.
*H04L 12/66* (2006.01)

(52) U.S. Cl. .................................. 370/352; 370/351

(58) Field of Classification Search .................. None
See application file for complete search history.

(56) References Cited

U.S. PATENT DOCUMENTS

| | | | |
|---|---|---|---|
| 5,568,477 A | 10/1996 | Galand et al. | |
| 5,825,772 A | 10/1998 | Dobbins et al. | |
| 5,842,038 A | 11/1998 | Williams et al. | |
| 5,978,370 A * | 11/1999 | Shively | 370/370 |
| 6,104,696 A | 8/2000 | Kadambi et al. | |
| 6,108,334 A * | 8/2000 | Blanc et al. | 370/389 |
| 6,181,681 B1 * | 1/2001 | Hiscock et al. | 370/279 |
| 6,343,081 B1 * | 1/2002 | Blanc et al. | 370/411 |
| 6,363,077 B1 * | 3/2002 | Wong et al. | 370/422 |
| 6,493,348 B1 * | 12/2002 | Gelman et al. | 370/401 |
| 6,658,006 B1 * | 12/2003 | Chen et al. | 370/395.1 |
| 6,901,452 B1 * | 5/2005 | Bertagna | 709/240 |
| 6,954,463 B1 * | 10/2005 | Ma et al. | 370/401 |
| 6,977,892 B2 * | 12/2005 | Kalkunte et al. | 370/230 |
| 6,981,058 B2 * | 12/2005 | Lin et al. | 709/242 |
| 7,027,394 B2 * | 4/2006 | Gupta et al. | 370/230.1 |
| 7,068,652 B2 * | 6/2006 | Lin et al. | 370/389 |
| 7,133,417 B1 * | 11/2006 | Kao et al. | 370/467 |
| 7,173,934 B2 * | 2/2007 | Lapuh et al. | 370/392 |
| 7,173,935 B2 * | 2/2007 | Lou et al. | 370/395.5 |
| 7,269,185 B2 * | 9/2007 | Kirkby et al. | 370/469 |
| 7,376,191 B2 * | 5/2008 | Melick et al. | 375/259 |
| 2002/0110148 A1 * | 8/2002 | Hickman et al. | 370/475 |
| 2005/0152346 A1 * | 7/2005 | Rabenko et al. | 370/352 |
| 2006/0013240 A1 * | 1/2006 | Ma et al. | 370/401 |
| 2006/0182112 A1 * | 8/2006 | Battle et al. | 370/392 |
| 2007/0009261 A1 * | 1/2007 | Nielsen | 398/45 |

* cited by examiner

*Primary Examiner*—Phirin Sam

(57) ABSTRACT

A network device includes at least one first network port, at least one second network port, a MUX unit and a switching unit. The MUX unit is connected to the at least one first network port. The MUX unit includes a trunk circuit and an output. The trunk circuit is configured to aggregate data packets received at the at least one first port into a trunk group and to output trunked data packets to the output. The switching unit is connected to the output of the MUX unit and to the at least one second network port. The switching unit is configured to switch the trunked data packets to the at least one second network port.

30 Claims, 6 Drawing Sheets

SYSTEM AND METHOD FOR ISOLATING NETWORK CLIENTS

BACKGROUND OF THE INVENTION

1. Field of the Invention

This invention relates to systems and methods for switching data within a data communications network. In particular, the present invention is related to systems and methods of isolating a group of network clients connected to a network device, such as a switch, router, repeater, etc.

2. Description of the Related Art

Over the last several years, the proliferation of the Internet has had a significant impact on many industries, especially the computer industry. The Internet has grown into an enormous worldwide system of computer networks to which virtually any large or small computer network, or individual computer, may be connected. Internet access is typically obtained via an Internet Service Provider (ISP). ISPs provide access to the Internet for their customers usually through membership subscriptions in conjunction with service level agreements (SLAs). ISPs make at least a portion of their income on service fees such as subscription fees, on demand provisioning of services, etc. One technique employed by ISPs is to regulate the amount of Internet bandwidth (i.e., data speed) that a customer is entitled based upon how much they pay. By regulating the amount of bandwidth available to each customer, ISPs may provide different levels or qualities of service at different rates.

Recently, a new class of service providers is targeting the needs of businesses and individuals in a multi-tenant unit (MTU), which is a generic term for a residential neighborhood, a building or group of buildings that accommodate more than one tenant. Examples of MTUs include high-rise office buildings, commercial business parks, hotels, college and university campus dormitories, and apartment buildings.

In addition to access to the Internet, ISPs, cable operators, and competitive local exchange carriers (CLECs) can leverage Internet access to offer a variety of value-added services to both business and residential subscribers, each available at an incremental additional fee or as part of a bundled services package. These same service providers also need the ability to change their services to meet shifting customer demands. A flexible, intelligent network infrastructure is needed that requires few changes to provision new services. Such networks in order to be successful must be easy to manage, monitor, and maintain, and also must be able to change with technology.

CLECs are now using fiber in metropolitan area networks (MANs) to deliver Ethernet connections to buildings having Category 5 wiring. For example, referring to FIG. 1, a group of subscribers may access the Internet via a Digital Subscriber Line Access Multiplexer (DSLAM) device, downstream from the Internet 100. A DSLAM is a network device, usually at a telephone company central office (CO), that receives signals from multiple customer Digital Subscriber Line (DSL) connections and puts the signals on a high-speed backbone line using multiplexing techniques. Depending on the product, DSLAM devices connect DSL lines with some combination of asynchronous transfer mode (ATM), frame relay, or Internet Protocol networks. DSLAM enables a phone company to offer business or homes users the fastest phone line technology (DSL) with the fastest backbone network technology (ATM).

DSLAM switches using ATM are circuit switches similar to telephone switches. Each subscriber 104 to 108 may be connected to the DSLAM 102 via ATM or DSL lines. Point-to-point protocol (PPP) is used to communicate subscribers 104 to 108 with the DSLAM 102. However, if the DSLAM 102 is changed to Ethernet and configured to use internet protocol (IP), then without any additional system or method to isolate the subscribers from one another, each subscriber will have direct access to each other via PPP. In order to provide security and isolation, typically a virtual LAN (VLAN) is established for an individual subscriber or a group of subscribers. A VLAN may be useful to isolate and restrict traffic between different departments in a company, such as a payroll, sales, engineering, and marketing, or to isolate and restrict traffic to different segments or nodes of a network. There are numerous types of VLANS, such as port configuration VLANs, MAC-based VLANs, LAYER 3 VLANs, IP Multicast VLANs, and Rule-based VLANs.

One disadvantage of a port-configuration VLAN is that a separate VLAN must be used for each port on the DSLAM 102 in order to provide security and isolation to each subscriber connected thereto. For example, referring to FIG. 2, shown is a block diagram of an Ethernet switch 102 connecting subscribers 104 to 108 to the Internet. As shown by a dotted line, in order to isolate each subscriber, a VLAN is added to the configuration of switch 102. Since VLANs are their own subnet, each VLAN takes up one IP address. Therefore, under this configuration, an undesirable high number of IP addresses are used. Also, each VLAN requires its own configuration and control, and switch 102 must be configured for each VLAN set up (i.e., for each subscriber connected thereto). As subscribers are added or subtracted, resources are spent configuring and reconfiguring network devices. Therefore, under this configuration, more time and money are spent on configuration and implementation of the Ethernet connections.

Accordingly, there is a need for new and improved systems and methods for providing Ethernet connections and while providing security and isolation users.

SUMMARY OF THE INVENTION

According to an embodiment of the present invention, provided is a network device. The network device includes at least one first network port, at least one second network port, a MUX unit, and a switching unit. The MUX unit is connected to the at least one first network port. The MUX unit includes a trunk circuit and an output. The trunk circuit is configured to aggregate data packets received at the at least one first port into a trunk group and to output trunked data packets to the output. The switching unit is connected to the output of the MUX unit and to the at least one second network port. The switching unit is configured to switch the trunked data packets to the at least one second network port.

According to another embodiment of the present invention, provided is a method for isolating a plurality of network clients. The method includes a step of providing a plurality of network ports. The plurality of network ports is connected to the plurality of network clients. The plurality of network ports includes a first group of network ports and a second group of network ports. The method also includes a step of isolating each of the first group of network ports from each other; a step of receiving input data packets at the first group of network ports; and a step of trunking the input data packets received at the first group of network ports. The method also includes a step of inputting the results of the trunking step into a switching unit of the network device, and a step of switching the input data packets to a port of the second group of port.

According to another embodiment of the present invention, provided is a network device. The network device includes a plurality of first network ports, at least one second network port, a MUX means, and a switching means. The MUX means is connected to the plurality of first network ports. The MUX means is for trunking data packets received at the at least one first port and for outputting trunked data packets. The switching means is connected to an output of the MUX means and to the at least one second network port. The switching means is for switching the trunked data packets to the at least one second network port.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
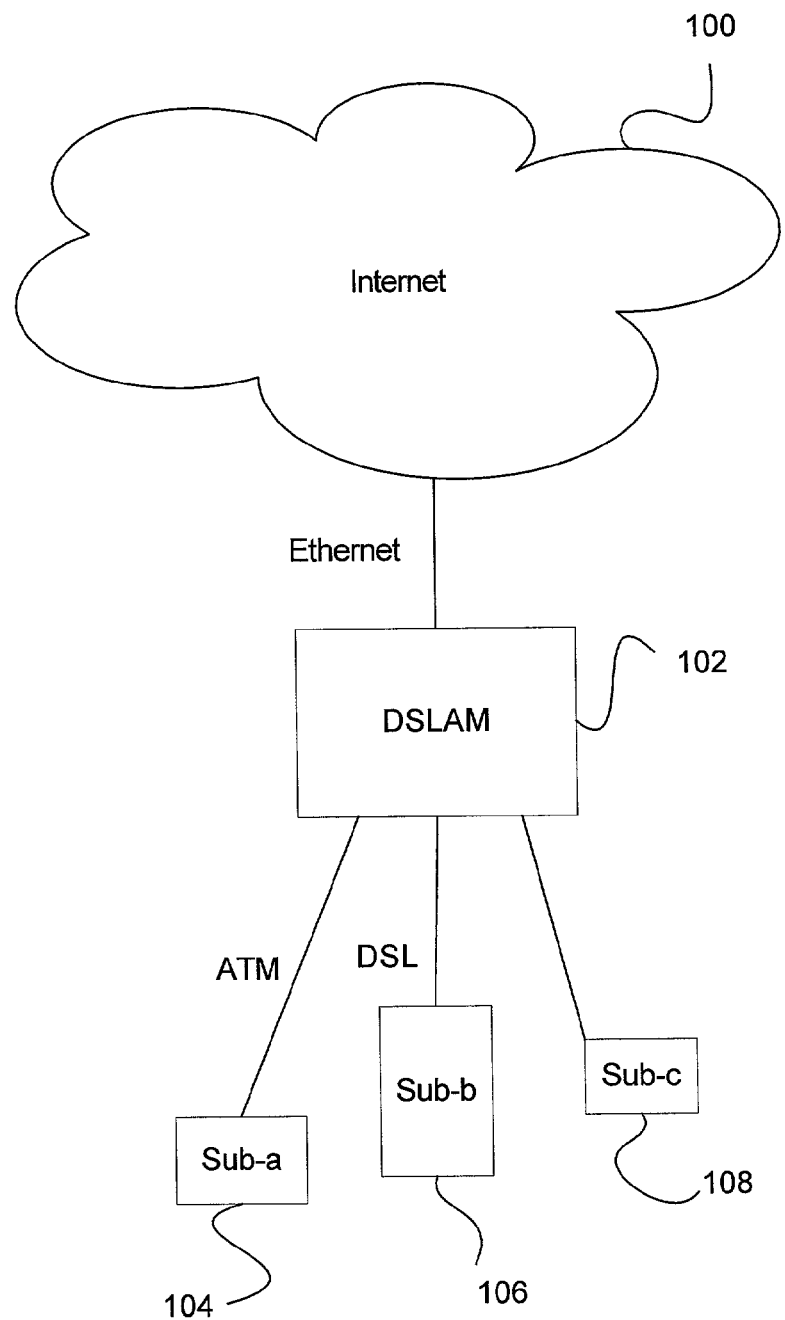
FIG. 1 is a block diagram of a network including a DSLAM device.
Figure 2:
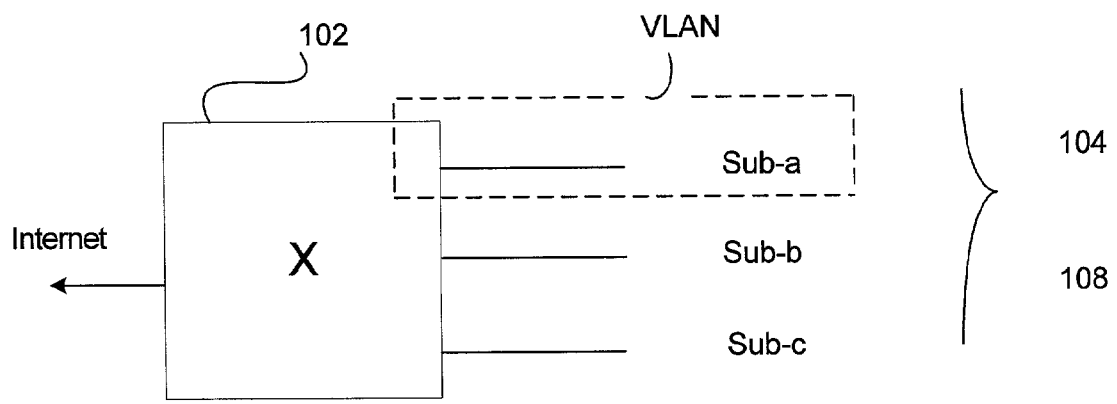
FIG. 2 is a block diagram of a network switch configuration.
Figure 3:
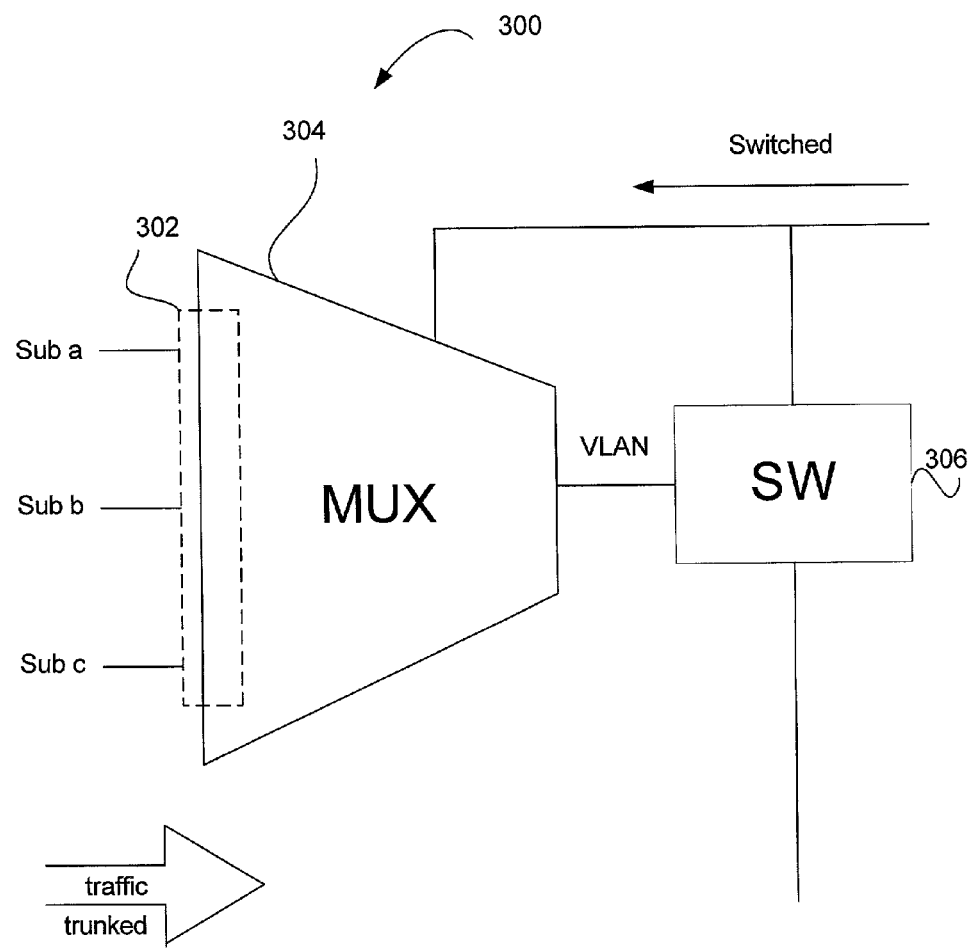
FIG. 3 is a block diagram of a network device in accordance with an embodiment of the invention.

FIG. 3 is a block diagram of a network device according to an embodiment of the present invention. Device 300 is referred to herein as a switch-MUX, because in this embodiment it has attributes of an Ethernet switch combined with a multiplexer. However, the term MUX is not meant to be limited to a multiplexer, and the term MUX may also refer to aggregation circuits and logic that may or may not have processing ability or intelligence built-in.

Switch-MUX 300 includes a plurality of ports 302 for connecting to network clients, such as subscribers Sub a-Sub c. Network ports 302 may include any layer-1 PHYs or transceivers configured to transmit and receive data packets. Ports 302 are connected to a multiplexer MUX 304 which aggregates or trunks signals input from network clients Sub a-Sub c. The output of MUX 304 is input into a switching unit 306 to be switched to a destination. MUX 304 may be a discrete multiplexer component or circuit, or may be an IC.

Switching unit 306 may include typical subsystems and components required to perform Ethernet switching, including layer 1 to layer 7 subsystems, including, if needed, a MAC (media access controller) and an ARL for performing address lookup and switching functions. A switching unit may include an Ethernet switch such as the one described, for example, in U.S. Pat. No. 6,104,696, which is incorporated by reference. Please note that U.S. Pat. No. 6,104,696 describes one example of a switching configuration, and the present invention is not meant to be limited to the embodiments described therein. One having ordinary skill in the art will readily understand that the present invention is applicable to many switching and other device configurations after reviewing this specification and the accompanying figures.

Figure 4:
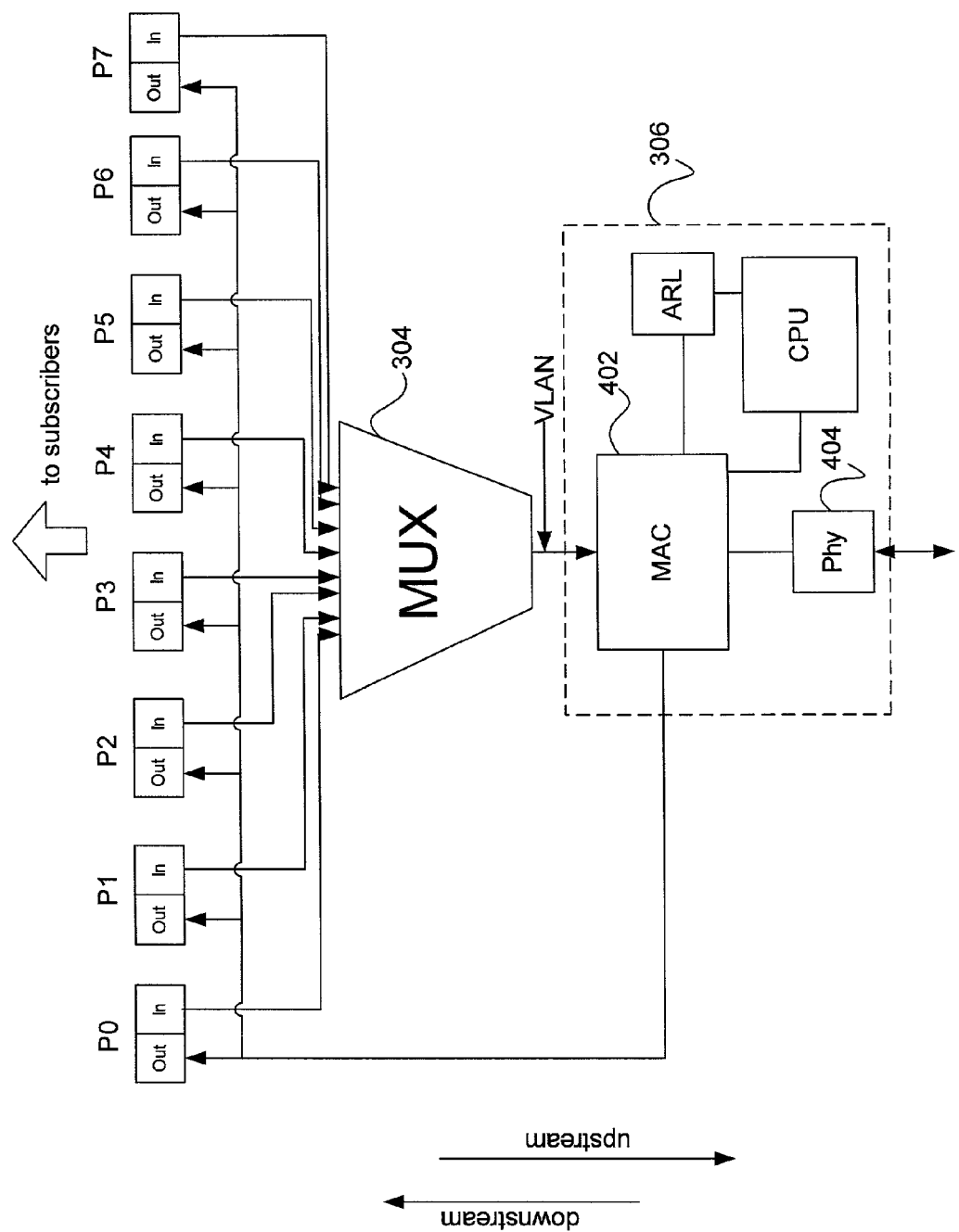
FIG. 4 is a schematic of a network device in accordance with an embodiment of the invention.

Hardware and/or software may be provided to allow switching unit 306 to switch (route) data packets both downstream (Sub a-Sub c) and upstream. As shown in FIG. 4, since one embodiment of the present invention is intended to provide Internet subscribers a link to the Internet, "upstream" is meant to refer to the direction from the device of the present invention towards the Internet, and "downstream" is meant to refer to the direction from the device toward an Internet subscriber, network client, etc.

A single VLAN may be provided between the output of MUX 304 and switching unit 306, to provide further security to the output of MUX 304. Since traffic from Sub a-Sub c is first trunked via MUX 304, each of Sub a-Sub c are isolated from one another. In other words, PPP is not used for communicating with Sub a-Sub c, and all signals from Sub a-Sub c are trunked together into a single trunk group and routed to switch 306 for switching.

Switching unit 306 may include a number of network ports (not shown) to facilitate traffic upstream or downstream. Switching unit 306 also includes appropriate circuitry to allow switching unit 306 to receive data packets via the output of MUX 304 and to switch data packets directly to any of its network ports or to network clients Sub a-Sub c. For example, referring to FIG. 4, switch-MUX 300 may include ports P0-P7 intended to provide communication link downstream. Each port may include a transceiver or PHY used to connect to a number of mediums in a number of protocols. Each port may also include an ingress and an egress, which may be physically separated from one another via circuitry or logically separated. Shown in FIG. 4, the ingress of each port P0-P7 is coupled to MUX 304 and trunked so that the output of MUX 304 is input into MAC 402. MAC 402 may be the MAC sub-layer of switch 306. Switching unit 306 may also include an ARL subsystem, a CPU, and other layer-7 subsystems for performing well-known switching functions.

The invention is capable of supporting switching-related functions at various levels of the OSI 7-layer model. Hubs or repeaters may operate at layer one, and essentially copy and "broadcast" incoming data to a plurality of spokes of the hub. The invention can support layer two switching-related devices which are typically referred to as multiport bridges and are capable of bridging two separate networks. Bridges can build a table of forwarding rules based upon which MAC (media access controller) addresses exist on which ports of the bridge, and pass packets which are destined for an address which is located on an opposite side of the bridge. The invention may employ bridges which utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, which can forward packets based upon network protocol-specific address information may be included within the invention. Layer three switches are capable of learning addresses and maintaining tables thereof which correspond to port mappings. Processing speed for layer three switches can be improved by utilizing specialized high performance hardware, and off-loading the host CPU so that instruction decisions do not delay packet forwarding.

Switching unit 306 is also shown having an additional transceiver or PHY 404 which may be used to connect to other network devices (e.g., upstream), such as to connect subscribers Sub a-Sub c to the Internet. As traffic is received into switching unit 306, either from an external port or from MUX 304, the MAC 402 in conjunction with the other subsystems of switching unit 306 may route the data packets as appropriate and perform other switching functions. Accordingly, circuitry is provided to route data packets directly to the egress of ports P0-P7 from MAC 402. Therefore, incoming traffic via ports P0-P7 may be trunked via circuitry and MUX 304.

Therefore, network devices connected to ports P0-P7 are automatically isolated from one another via MUX 304. Traffic going downstream to subscribers or network clients connected to ports P0-P7 is switched normally and routed outside of MUX 304 directly to the ports P0-P7, such as via circuitry. For example, in FIG. 4 each egress is connected directly to MAC 402 and traffic switched downstream is routed around MUX 304. Accordingly, all traffic into switch-MUX 300 is switched, however only traffic upstream (i.e., from ports P0-P7) is trunked.

Switch MUX 300 is an exemplary configuration and may include certain additional circuitry and components such as appropriate memory buffers, schedulers, output queues, QOS function blocks (subsystems), etc. For example, in order to prevent collisions from traffic coming into ports P0-P7 as they are routed to switching unit 306, MUX 304 may include a buffer and/or an output queue (scheduler) for outputting trunked traffic to switching unit 306.

The obvious advantages of the present invention include automatic isolation of network clients. Via a switch-MUX configuration, PPP is eliminated between network clients downstream of the multiplexer unit, however, switching is still achieved both upstream and downstream. Also, only one subnet is set up per Ethernet switch, and therefore, only one IP address is required for a plurality of downstream subscribers. This reduces the overall number of IP addresses used within a CLEC or ISP network, and also reduces the number of VLANs which must be configured and maintained. Therefore, the present invention improves the amount of time and resources required to configure and maintain a network.

Figure 6:
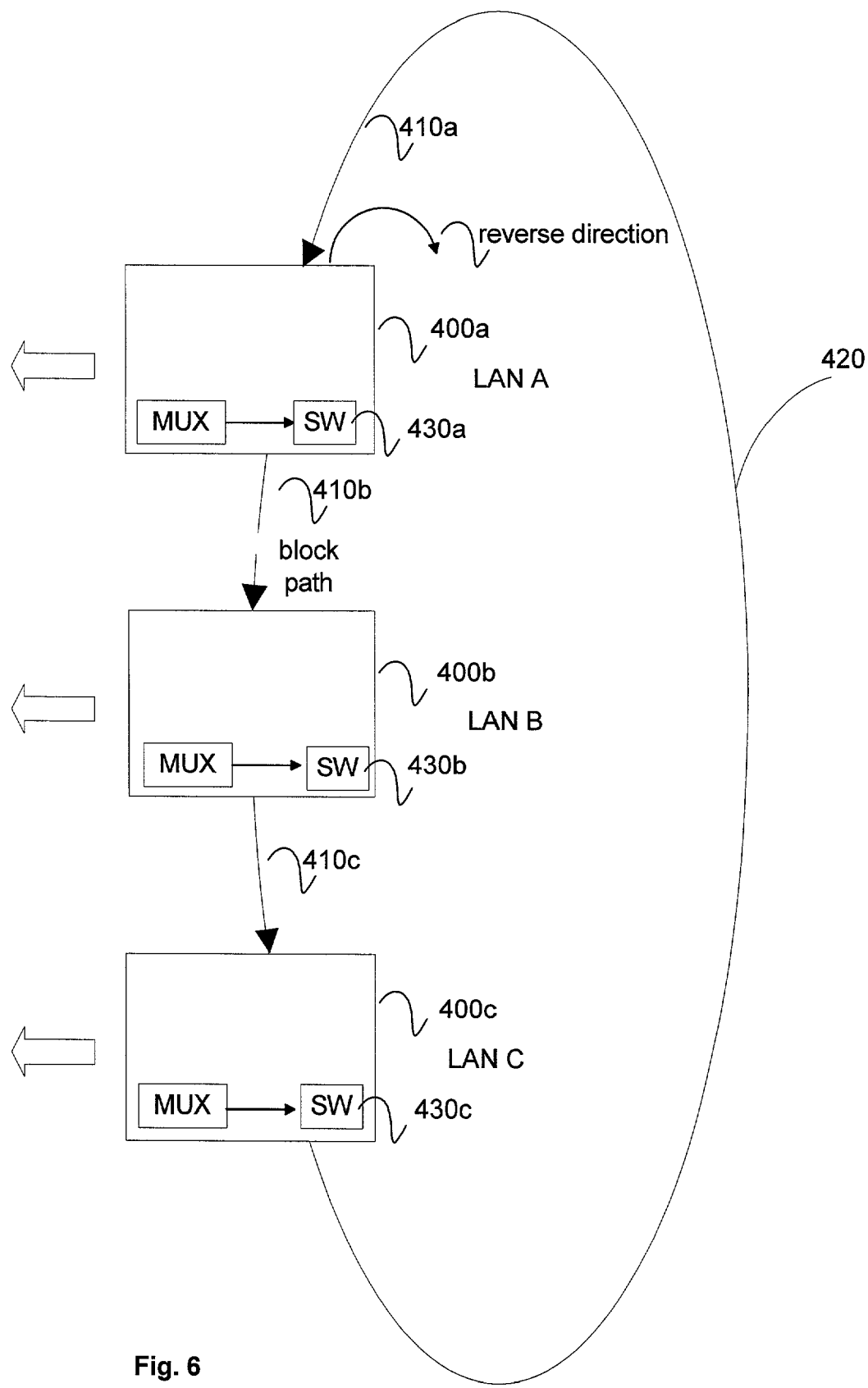
FIG. 6 is a schematic of a network device in accordance with another embodiment of the invention.

In an alternative embodiment, the invention may be configured to operate within a ring configuration as a forwarding unit 400 to connect a series of networks, as illustrated for example in FIG. 6. The series of local area networks 400 (LANs) may connect to form an interconnected network 420. Each LAN may include a forwarding unit 400 for forwarding data packets from one LAN to another LAN or from one segment of a network to another segment. Each forwarding unit 400 may include a multiplexer connected to a bridge, router, hub or switch. The forwarding unit 400 may be configured to transmit data packets to subscribers connected to the respective networks, as described above. In a LAN such as an Ethernet or token ring network, forwarding unit 400a may broadcast or flood a data packet to its respective subscribers via ports (not shown) if the packet's destination is unknown. However, this flooding of the data packet by forwarding unit 400a may be replicated to another forwarding unit, for example, forwarding unit 400b. Forwarding unit 400b may also replicate the data packet. Since forwarding unit 400a and 400b have more than one interconnection, which forms a loop, the broadcasting of the data packet across the interconnected networks may cause the data packets to circle interconnected network 420 endlessly. Each transmission of the data packet to another LAN within interconnected network 420 may result in creating more replication of the data packets causing a snowball effect, (often referred to as a "broadcast storm"), which may eventually consume all the available bandwidth of the LANs.

To prevent broadcast storms from occurring within an interconnected network, a spanning tree algorithm, which is a known method of creating multiple paths while preventing loops, may be employed in the invention. The spanning tree protocol is capable of detecting and breaking circular traffic patterns by disabling certain links within interconnected network 420. For instance, in the ring configuration in FIG. 6, a data packet being transmitted from LAN A to LAN C has the option of traveling either via path 410a or via path 410b through forwarding unit 400b and along path 410c to LAN C. By incorporating a spanning tree algorithm into network 420, the spanning tree algorithm will choose the lowest-cost path, for example, path 410a and block the duplicate path heading towards path 410b to ensure that there is only one physically active path to forwarding unit 400c of LAN C.

When the spanning tree algorithm blocks path 410b, the data packets must now travel in the reverse direction from LAN A via path 410a to LAN C. Thus, the invention may be configured to include a bi-directional switch 430, which is capable of reversing the direction of the path of the data packets. In other words, the invention may be configured so that an uplink can be converted into a downlink and a downlink can be converted into an uplink by reversing the direction of the data packet's path.

Figure 5:
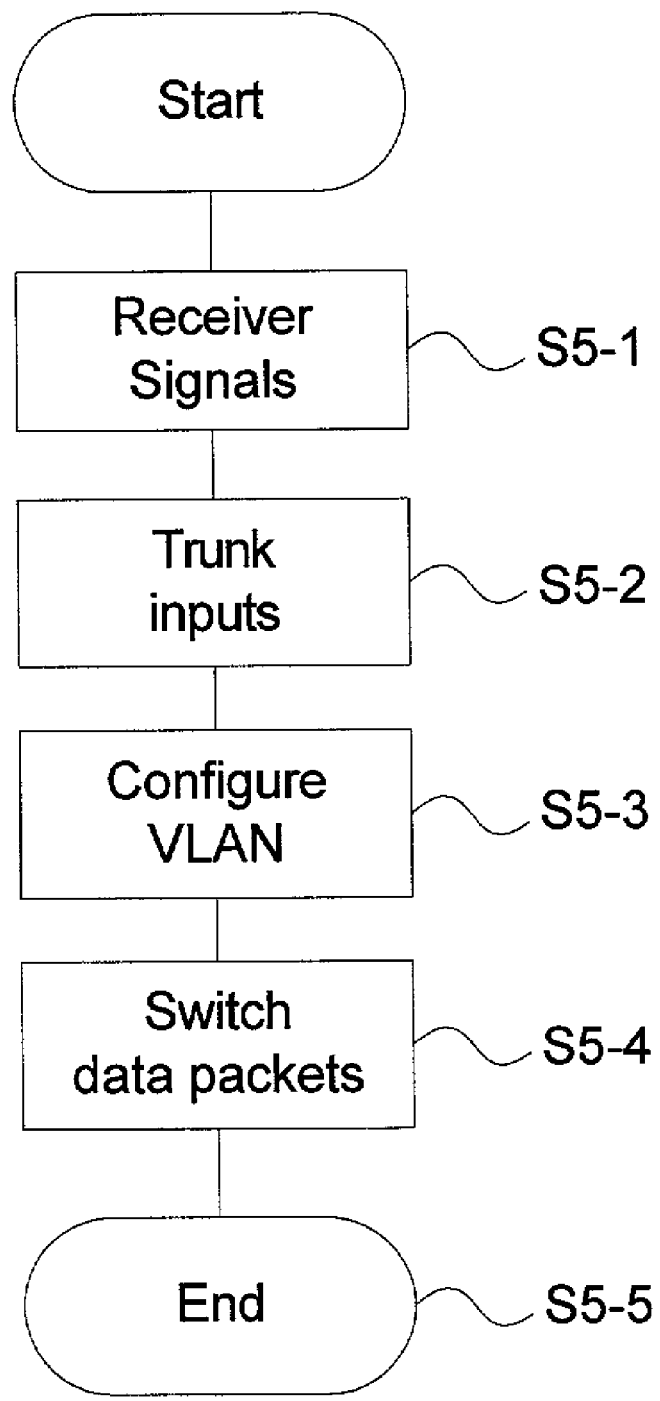
FIG. 5 is flowchart of a method for isolating network clients within a network according to an embodiment of the invention.

FIG. 5 is a flowchart of a method for isolating network clients according to an embodiment of the present invention. Processing begins and immediately proceeds to step S5-1. At step S5-1, a data packet may be received at a network device such as a switch from another device downstream of the switch. In a configuration as described above, any data packets received from downstream network clients are trunked together at step S5-2. As described above with reference to FIGS. 3-4, a multiplexer may be used to aggregate or trunk data packets together from a plurality of downstream network clients. Accordingly, a switch-MUX configuration may be provided as described above, which physically isolates traffic heading upstream before it is switched.

At step S5-3, the output of the trunked signals is transmitted via a VLAN to a switching unit. The VLAN may be configured to provide security and isolation to the MUX as described above. As already described above, the necessary components may be provided to allow the data packets to be trunked without collisions. Therefore, the data packets may be buffered first and scheduled before being communicated to the switching unit for routing. Next, at step S5-4, data packets, which are received at the switching unit, may be switched as normally upstream or downstream. However, because of the circuit isolation of downstream network clients, the switch-MUX configuration must include logic or circuitry to allow switching to the downstream clients without inhibiting the isolation provided by the MUX. This can be accomplished as already described above.

Processing ends at step S5-5.

Although the invention has been described based upon these preferred embodiments, it would be apparent to those of skilled in the art that certain modifications, variations, and alternative constructions would be apparent, while remaining within the spirit and scope of the invention. For example, any network device which has multiple connectivity may be implemented in accordance with the present invention in order to isolate and secure connections. Also, other switch configurations could be used to take advantage of the present invention. In order to determine the metes and bounds of the invention, therefore, reference should be made to the appended claims.

I claim:

1. An apparatus, comprising:
at least one first network port;
at least one second network port;
a multiplexer (MUX) unit connected to said at least one first network port, said MUX unit comprising a trunk circuit and an output, said trunk circuit configured to aggregate data packets received at said at least one first port into a trunk group and to output trunked data packets to said output, wherein the MUX unit is configured to isolates each port of said first group of network ports from each other; and a switching unit connected to the output of said MUX unit and to said at least one second network port, and configured to switch said trunked data packets to said at least one second network port.

2. The apparatus as recited in claim 1, wherein said at least one first network port comprises at least one downstream network port, and said at least one second network port comprises at least one upstream network port.

3. The apparatus as recited in claim 1, wherein said switching unit is further connected to said at least one first network port, wherein data packets received from said output of said MUX unit or from said at least one second network port are switched to said at least one first network port.

4. An apparatus, comprising:
at least one first network port;
at least one second network port;
a multiplexer (MUX) unit connected to said at least one first network port of a plurality of first network ports, said MUX unit comprising a trunk circuit and an output, said trunk circuit configured to aggregate data packets received at said at least one first port into a trunk group and to output trunked data packets to said output, wherein the MUX unit is configured to isolate each port of the plurality of first network ports from the other ports of the plurality of first network ports; and
a switching unit connected to the output of said MUX unit and to said at least one second network port, and configured to switch said trunked data packets to said at least one second network port, wherein said switching unit further comprises a media access controller (MAC) and an address resolution logic unit (ARL) configured to switch data packets.

5. An apparatus, comprising:
at least one first network port;
at least one second network port;
a multiplexer (MUX) unit connected to said at least one first network port of a plurality of first network ports, said MUX unit comprising a trunk circuit and an output, said trunk circuit configured to aggregate data packets received at said at least one first port into a trunk group and to output trunked data packets to said output; and
a switching unit connected to the output of said MUX unit and to said at least one second network port, and configured to switch said trunked data packets to said at least one second network port, wherein said trunking circuit comprises at least one isolation circuit corresponding to said at least one first network port, and wherein the at least one isolation circuit is configured to isolate at least one port of said plurality of first network ports from one another.

6. The apparatus as recited in claim 5, wherein said trunking circuit is configured to eliminate point-to-point protocol (PPP) communications between a plurality of ports.

7. The apparatus as recited in claim 5, wherein said trunking circuit comprises a multiplexer.

8. The apparatus as recited in claim 5, wherein said MUX unit comprises a memory buffer, said memory buffer configured to store data packets from said at least one first network port.

9. The apparatus as recited in claim 8, wherein said MUX unit comprises a scheduler coupled with said memory buffer and configured to queue data packets stored in said memory buffer.

10. A method for isolating a plurality of network clients, said method comprising:
providing a plurality of network ports, at least one of said plurality of network ports being connected to at least one client of said plurality of network clients, said plurality of network ports comprising a first group of network ports and a second group of network ports;
isolating each of said first group of network ports from each other;
receiving input data packets at said first group of network ports;
trunking said input data packets received at said first group of network ports;
inputting the results of said trunking into a switching unit; and
switching said input data packets to a port of said second group of ports.

11. The method as recited in claim 10, wherein said isolating comprises providing a multiplexer having a plurality of inputs and an output, and coupling said plurality of inputs of said multiplexer with said first group of network ports, and wherein said trunking is performed by said multiplexer, the results of said trunking being output from said multiplexer.

12. The method as recited in claim 10, further comprising:
buffering said input data packets prior to trunking said input data packets.

13. The method as recited in claim 12, further comprising:
scheduling said input data packets that are buffered in said buffering prior to trunking said input data packets.

14. The method as recited in claim 10, further comprising:
providing a trunking circuit which receives said input data packets from said first group of ports, said trunking circuit eliminating point-to-point protocol (PPP) communications between each of said first group of ports, wherein an output of said trunking circuit is the result of said trunking.

15. The method as recited in claim 10, further comprising:
providing a separate circuit for switching results of said trunking to a port of said first group of network ports.

16. The method as recited in claim 10, further comprising:
connecting the first group of network ports in a ring topology.

17. The method as recited in claim 16, further comprising:
designating an uplink and a downlink for transmitting the data packets.

18. The method as recited in claim 17, further comprising:
reversing a direction of the uplink and reversing a direction of the downlink.

19. An apparatus, comprising:
at least one first network port;
at least one second network port;
multiplexer (MUX) means connected to said plurality of first network ports, said MUX means for trunking data packets received at said at least one first port and outputting trunked data packets, wherein the MUX means is configured to isolates each port of said first group of network ports from each other; and
switching means connected to an output of said MUX means and to said at least one second network port, said switching means for switching said trunked data packets to said at least one second network port.

20. The apparatus as recited in claim 19, wherein said at least one first network port comprises at least one downstream network port, and said at least one second network port comprises at least one upstream network port.

21. The apparatus as recited in claim 19, wherein said switching means is further connected to said at least one first network port, wherein data packets received from said output of said MUX means or from said at least one second network port are switched to said at least one first network port.

22. An apparatus, comprising:
at least one first network port;
at least one second network port;
multiplexer (MUX) means connected to said at least one network port of a plurality of first network ports, said MUX means for trunking data packets received at said at least one first port and outputting trunked data packets, wherein the MUX means is configured to isolate each port of the plurality of first network ports from one another; and
switching means connected to an output of said MUX means and to said at least one second network port, said switching means for switching said trunked data packets to said at least one second network port, wherein said switching means further comprises a media access controller (MAC) means for performing Ethernet switching and address resolution logic (ARL) means for performing address resolution.

23. An apparatus, comprising:
at least one first network port;
at least one second network port;
multiplexer (MUX) means connected to said plurality of first network ports, said MUX means for trunking data packets received at said at least one first port and outputting trunked data packets; and
switching means connected to an output of said MUX means and to said at least one second network port, said switching means for switching said trunked data packets to said at least one second network port, wherein said MUX means comprises a plurality of isolation circuit means corresponding to each of said plurality of first network ports, said plurality of isolation circuit means for isolating at least one port of said plurality of first network ports from the other ports of the plurality of first network ports.

24. The apparatus as recited in claim 23, wherein said plurality of isolation circuit means eliminate point-to-point protocol (PPP) communications between ports of said plurality of first network ports.

25. The apparatus as recited in claim 23, wherein said MUX means further comprises:
multiplexer means for trunking said input data packets.

26. The apparatus as recited in claim 23, wherein said MUX means comprises memory buffer means for storing data packets from said first plurality of network ports.

27. The apparatus as recited in claim 26, wherein said MUX means comprises scheduler means for queuing data packets stored in said memory buffer means.

28. The apparatus as recited in claim 19, wherein the plurality of first network ports is connected in a ring topology.

29. The apparatus as recited in claim 28, wherein the apparatus is configured to designate an uplink and a downlink for transmitting the data packets.

30. The apparatus as recited in claim 29, wherein the apparatus is configured to reverse a direction of the uplink and reverse a direction of the downlink.

* * * * *

UNITED STATES PATENT AND TRADEMARK OFFICE
CERTIFICATE OF CORRECTION

| | |
|---|---|
| PATENT NO. | : 7,660,292 B2 |
| APPLICATION NO. | : 10/180510 |
| DATED | : February 9, 2010 |
| INVENTOR(S) | : David Wong |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2155 days.

In column 7, line 2, in claim 1, delete "isolates" and insert -- isolate --, therefor.

In column 8, line 56, in claim 19, delete "isolates" and insert -- isolate --, therefor.

In column 9, line 18, in claim 22, after "comprises" delete "a".

Signed and Sealed this

Sixteenth Day of November, 2010

David J. Kappos
*Director of the United States Patent and Trademark Office*